(12) United States Patent
Xiong

(10) Patent No.: US 8,312,196 B2
(45) Date of Patent: Nov. 13, 2012

(54) DUAL PROCESSOR SYSTEM AND METHOD FOR USING THE SAME

(75) Inventor: Wen-Fei Xiong, Shanghai (CN)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 96 days.

(21) Appl. No.: 13/085,442

(22) Filed: Apr. 12, 2011

(65) Prior Publication Data
US 2012/0226844 A1 Sep. 6, 2012

(51) Int. Cl.
*G06F 13/24* (2006.01)
(52) U.S. Cl. .................. 710/267; 711/150
(58) Field of Classification Search ........... 710/266–268; 711/147–152; 709/216
See application file for complete search history.

(56) References Cited

U.S. PATENT DOCUMENTS
8,230,180 B2 * 7/2012 Kim et al. .................. 711/147
2002/0165896 A1 * 11/2002 Kim .............................. 709/102

* cited by examiner

*Primary Examiner* — Clifford Knoll
(74) *Attorney, Agent, or Firm* — Altis Law Group, Inc.

(57) ABSTRACT

A dual processor system comprises a first processor, a second processor, and a dual-ported random access memory (DPRAM). When the first processor stores data to be processed by the second processor to the DPRAM and writes interrupt data to the DPRAM, the DPRAM generates a first information status. The second processor reads the interrupt data once when detecting the first information status, processes the to be processed data when successfully reading the interrupt data once, and reads the interrupt data twice when completing processing the to be processed data. The DPRAM generates a second information status when the second processor successfully reads the interrupt data twice, and the first processor identifies that the second processor has processed the to be processed data when detecting the second information status.

12 Claims, 3 Drawing Sheets

DUAL PROCESSOR SYSTEM AND METHOD FOR USING THE SAME

BACKGROUND

1. Technical Field

The present disclosure relates to processor systems for electronic devices, and particularly to a dual processor system and a method for using the same.

2. Description of Related Art

Many electronic devices use dual processor systems to improve data processing rates. Dual-ported random access memory (DPRAM) are often used in the dual processor systems for communication between the dual processors. For example, FIG. 3 shows one such dual processor system 300, which includes a first processor 40, a second processor 50, and a DPRAM 60. The DPRAM 60 includes a data area 61, a mailbox area 62, a first interrupt pin Int1, and a second interrupt pin Int2. The mailbox area 62 includes a first mailbox 621 and a second mailbox 622. The data area 61, the first mailbox area 621, and the second mailbox 622 are all electrically connected to both the first processor 40 and second processor 50. The first interrupt pin Int1 and the second interrupt pin Int2 are electrically connected to the first processor 40 and the second processor 50, respectively.

In use of the dual processor system 300, the first processor 40 and second processor 50 can communicate with each other through the DPRAM 60, thereby cooperating with each other to process data. For example, when the second processor 50 is used to share data processing work of the first processor 40, the first processor 40 stores the data to be processed by the second processor 50 in the data area 61. When the first processor 40 completes storing the data to be processed by the second processor 50, the first processor 40 writes first interrupt data to the second mailbox 622. Upon receiving the first interrupt data, the DPRAM 60 correspondingly generates a first information status (e.g., a predetermined low voltage level) on the second interrupt pin Int2. Upon detecting the first information status generated on the second interrupt pin Int2, the second processor 50 reads the first interrupt data stored in the second mailbox 622. When the second processor 50 has successfully read the first interrupt data in the second mailbox 622, the DPRAM 60 correspondingly generates a second information status (e.g., a predetermined high voltage level) on the second interrupt pin Int2. Upon detecting the second information status, the second processor 50 processes the data stored in the data area 61.

When the second processor 50 completes the processing work of the data stored in the data area 61, the second processor 50 writes second interrupt data to the first mailbox 621. Upon receiving the second interrupt data, the DPRAM 60 correspondingly generates a third information status (e.g., a voltage level having a predetermined voltage value) on the first interrupt pin Int1. Upon detecting the third information status, the first processor 50 reads the second interrupt data from the first mailbox 621, and identifies that the second processor 50 has already processed the data stored in the data area 61 according to the second interrupt data.

As above detailed, each cooperative data processing work of the first processor 40 and the second processor 50 needs to perform many data transmission operations. These data transmission operations may decrease data processing rate of the dual processor system 300, and occupy many system resources of electronic devices using the dual processor system 300.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
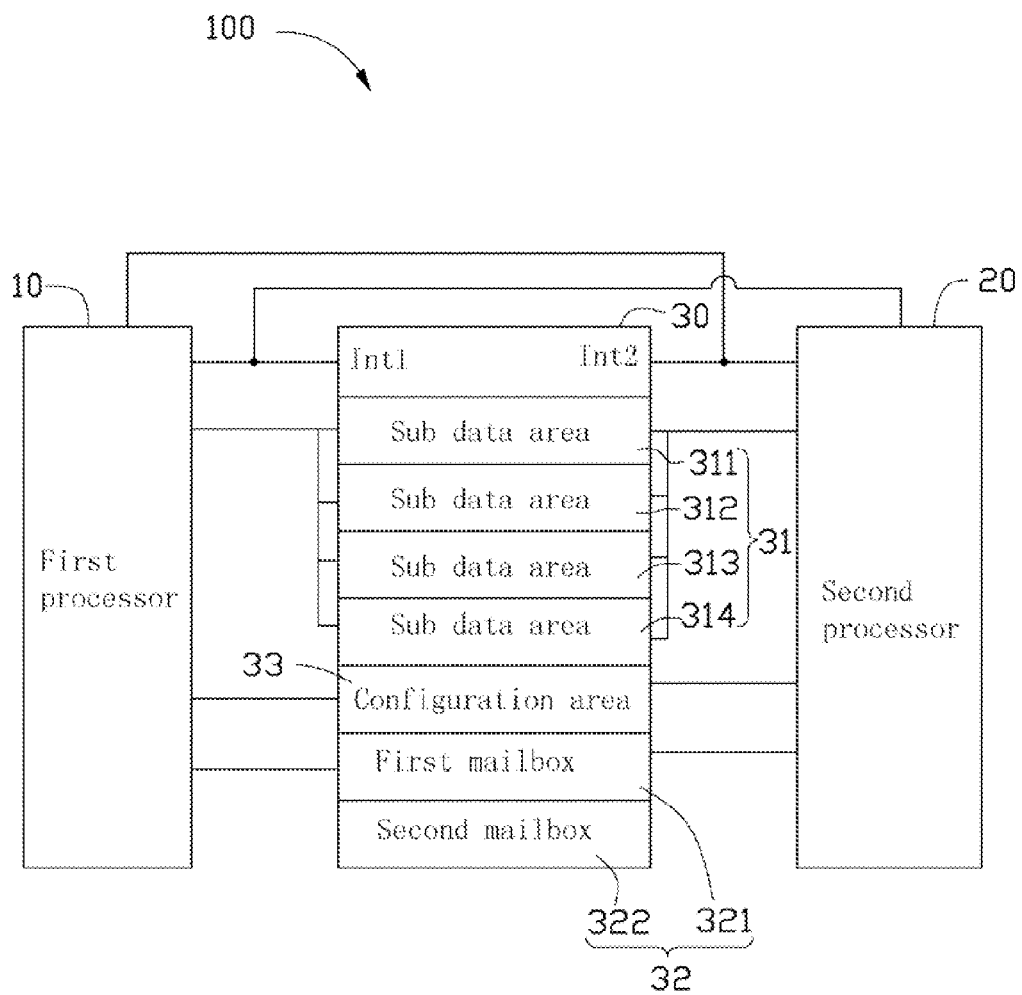
FIG. 1 is a block diagram of a dual processing system, according to an exemplary embodiment.

FIG. 1 shows a dual processor system 100, according to an exemplary embodiment. The dual processor system 100 can be used in electronic devices such as personal computers (PC), or personal digital assistants (PDA), for example. The dual processor system 100 includes a first processor 10, a second processor 20, and a dual-ported random access memory (DPRAM) 30. The first processor 10 and second processor 20 are both electrically connected to the DPRAM 30. In use, the first processor 10 and the second processor 20 can communicate with each other through the DPRAM 30, thereby cooperating with each other to process data.

The DPRAM 30 includes a data area 31, a mailbox area 32, a configuration area 33, a first interrupt pin Int1, and a second interrupt pin Int2. The data area 31 can include a plurality of sub data areas. In this embodiment, the data area 31 includes four sub data areas 311, 312, 313, 314. The mailbox area 32 includes a first mailbox 321 and a second mailbox 322. All the sub data areas 311, 312, 313, 314 of the data area 31, the first mailbox area 321 and the second mailbox 322 of the mailbox area 32, the configuration area 33, the first interrupt pin Int1, and the second interrupt pin Int2 are all electrically connected to both the first processor 10 and second processor 20.

Both the first interrupt pin Int1 and the second interrupt pin Int2 have a first information status and a second information status. In this embodiment, the first information status is a predetermined low voltage level generated on the first interrupt pin Int1 or the second interrupt pin Int2, and the second information status is a predetermined high voltage level generated on the first interrupt pin Int1 or the second interrupt pin Int2. When the second processor 20 writes data to the first mailbox 321, the DPRAM 30 correspondingly generates the first information status in the first interrupt pin Int1. When the first processor 10 successfully reads data stored in the first mailbox 321, the DPRAM 30 correspondingly generates the second information status on the first interrupt Int1. When the first processor 10 writes data to the second mailbox 322, the DPRAM 30 correspondingly generates the first information status on the second interrupt pin Int2. When the second processor 20 successfully reads data stored in the second mailbox 322, the DPRAM 30 correspondingly generates the second information status on the second interrupt Int2.

Figure 2:
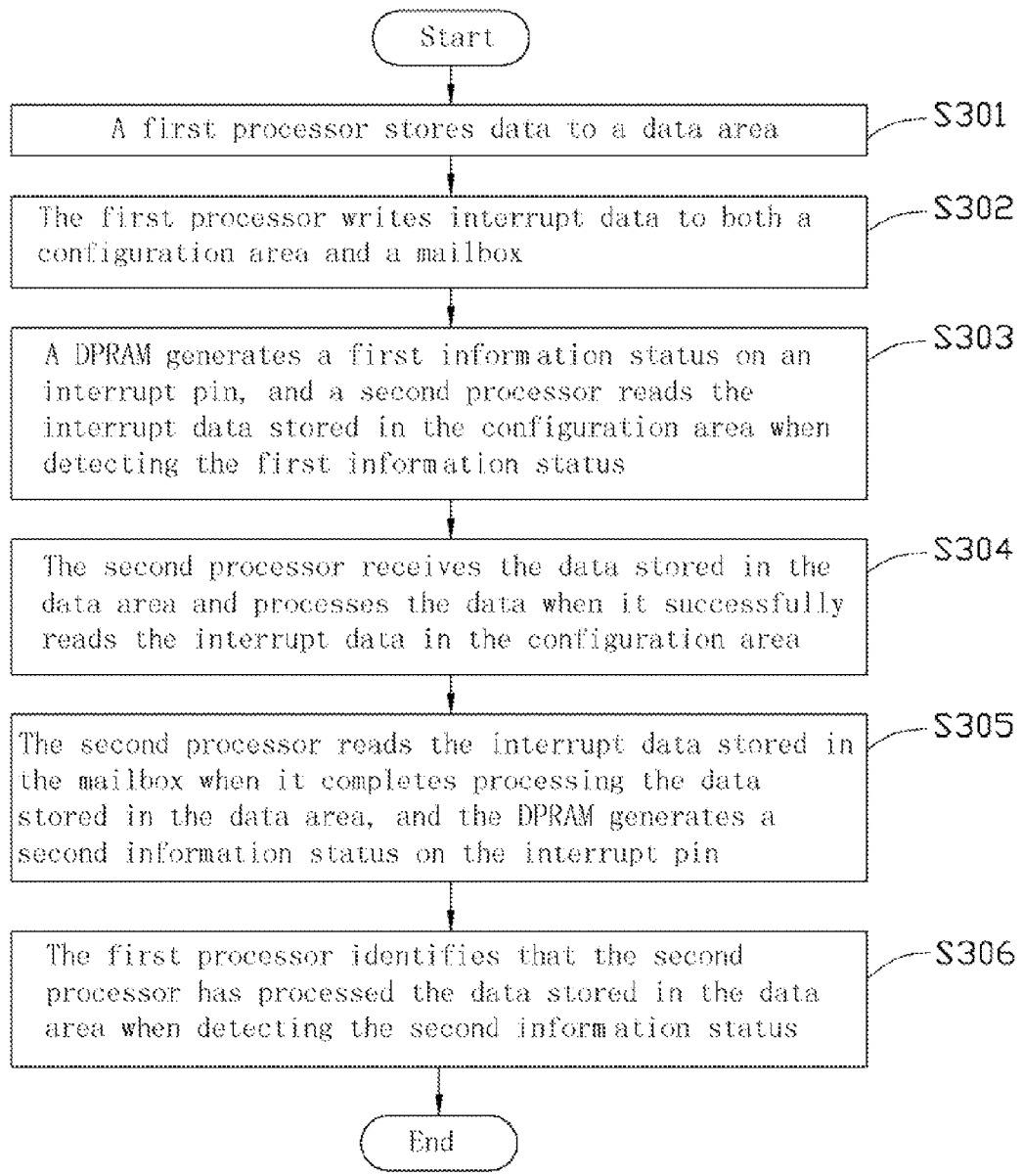
FIG. 2 is a flowchart of a method for using the dual processing system shown in FIG. 1.
Figure 3:
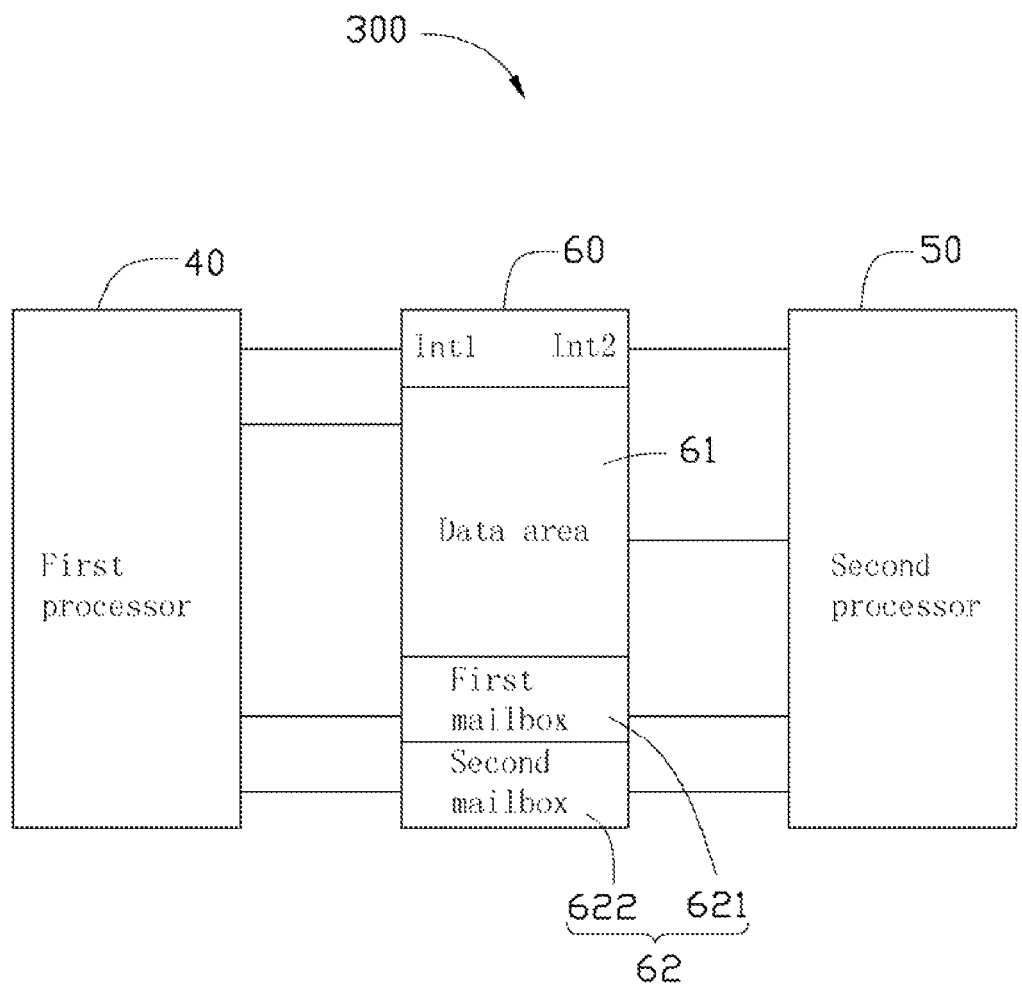
FIG. 3 is a block diagram of a conventional dual processing system.

Also referring to FIG. 2, a method for using the dual processor system 100, according to an exemplary embodiment, includes steps as follows. This exemplary embodiment uses the second processor 20 to share data processing work of the first processor 10.

First, the first processor 10 stores the data to be processed by the second processor 20 in any one selected from the sub data areas 311, 312, 313, and 314 of the data area 31 (e.g., the sub data area 311) (Step S301). When the first processor 10 completes the storage of the data to be processed by the second processor 20, the first processor 10 writes interrupt data to both the second mailbox 322 and the configuration area 33 (Step S302). Thus, the DPRAM 30 generates the first information status on the second interrupt pin Int2. Upon detecting the first information status generated on the second interrupt pin Int2, the second processor 20 reads the interrupt data stored in the configuration area 33 (Step S303). When the second processor 20 has successfully read the interrupt data in the configuration area 33, the second processor 20 detects that the data to be processed by the second processor 20 is stored in the sub data area 311. Thus, the second processor 20 processes the data stored in the sub data area 311 (Step S304).

When the second processor 20 completes the processing work of the data stored in the sub data area 311, the second processor 20 reads the interrupt data stored in the second mailbox 322. When the interrupt data stored in the second mailbox 322 is successfully read by the second processor 20, the DPRAM 30 correspondingly generates the second information status on the second interrupt pin Int2 (Step S305). Upon detecting the second information status on the second interrupt Int2, the first processor 10 identifies that the second processor 20 has already processed the data stored in the selected sub data area 311 (Step S306).

In above method, when the second processor 20 is processing the data stored in the selected sub data area 311, the first processor 10 can store new data to be processed by the second processor 20 in any one of the other sub data areas 312, 313, 314 (i.e., performing a next step S301). After the first processor 10 identifies that the second processor 20 has already processed the data stored in the selected sub data area 311, the first processor 10 writes new interrupt data to both the configuration area 33 and the second mailbox 322 (i.e., performing a next step S302). Thus, the DPRAM 30 generates a next first information status on the second interrupt pin Int2. Upon detecting the next first information status, the second processor 20 reads the new interrupt data stored in the configuration area 33 and processes the new data stored in the sub data area 312/313/314 when successfully reading the new interrupt data stored in the configuration area 33 (i.e., performing next steps S303, S304). Next steps S305, S306 can be performed similar to above. Accordingly, in this embodiment, the step S301 of a next data processing work can be performed during the steps S304, S305, and S306 of a previous data processing work.

The first processor 10 can also be used to share data processing work of the second processor 20 by a method that is substantially similar to above method for using the second processor 20 to share data processing work of the first processor 10. This differs from above method only in that the work of the first processor 10 and the second processor 20 are exchanged with each other, and the first mailbox 321 and the first interrupt Int1 respectively replace the second mailbox 322 and the second interrupt Int2 to be used.

In the present disclosure, when either one of the first processor 10 or the second processor 20 share the data processing work of the other, only one kind of interrupt data needs to be written to the DPRAM 30. Only one of the two mailboxes 321, 322 and one of the two interrupt pins Int1, Int2 are used. Compared with other dual processor systems, such as aforementioned dual processor system 300, the present disclosure can perform less data transmission operations and use less hardware, and thereby achieves a higher data processing rate and conserves system resources of electronic devices using the present disclosure.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A dual processor system for electronic devices, comprising:
   a first processor;
   a second processor; and
   a dual-ported random access memory (DPRAM) electrically connected to the first processor and the second processor; wherein when the first processor stores data to be processed by the second processor to the DPRAM and writes interrupt data to the DPRAM, the DPRAM generates a first information status; the second processor reads the interrupt data once when detecting the first information status, processes the to be processed data when successfully reading the interrupt data once, and reads the interrupt data twice when completing processing the to be processed data; the DPRAM generates a second information status when the second processor successfully reads the interrupt data twice, and the first processor identifies that the second processor has processed the to be processed data when detecting the second information status.

2. The dual processor system as claimed in claim 1, wherein when the second processor stores data to be processed by the first processor to the DPRAM and writes the interrupt data to the DPRAM, the DPRAM generates the first information status; the first processor reads the interrupt data once when detecting the first information status, processes the to be processed data when successfully reading the interrupt data once, and reads the interrupt data twice when completing processing the to be processed data; the DPRAM generates the second information status when the first processor successfully reads the interrupt data twice, and the second processor identifies that the first processor has processed the to be processed data when detecting the second information status.

3. The dual processor as claimed in claim 2, wherein the DPRAM includes a data area, two mailboxes, a configuration area, and two interrupt pins; when the first processor stores data to be processed by the second processor to the data area and writes interrupt data to the configuration area and one of the two mailboxes, the DPRAM generates the first information status on one of the two interrupt pins; the second processor reads the interrupt data stored in the configuration area when detecting the first information status on the one of the two interrupt pins, processes the data stored in the data area when successfully reading the interrupt data stored in the configuration area, and reads the interrupt data stored in the one of the two mailboxes when completing processing the data stored in data area; the DPRAM generates the second information status on the one of the two interrupt pins when the second processor successfully reads the interrupt data stored in the one of the two mailboxes, and the first processor identifies that the second processor has processed the data stored in the data area when detecting the second information status on the one of the two interrupt pins.

4. The dual processor system as claimed in claim 3, wherein when the second processor stores data to be processed by the first processor to the data area and writes interrupt data to the configuration area and the other of the two mailboxes, the DPRAM generates the first information status on the other of the two interrupt pins; the first processor reads the interrupt data in the configuration area when detecting the first information status on the other of the two interrupt pins, processes the data stored in the data area when successfully reading the interrupt data stored in the configuration area, and reads the interrupt data stored in the other of the two mailboxes when completing processing the data stored in data area; the DPRAM generates the second information status on the other of the two interrupt pins when the first processor successfully reads the interrupt data stored in the other of the two mailboxes, and the second processor identifies that the first processor has processed the data stored in the data area when detecting the second information status on the other of the two interrupt pins.

5. The dual processor system as claimed in claim 4, wherein the first information status is a predetermined low voltage level generated on either of the two interrupt pins, and the second information status is a predetermined high voltage level generated on either of the two interrupt pins.

6. The dual processor system as claimed in claim 3, wherein the data area includes a plurality of sub data areas, and the first processor stores the data to be processed by the second processor in one of the sub data areas.

7. The dual processor system as claimed in claim 6, wherein when the second processor is processing the data stored in the one of the sub data areas, the first processor further stores new data to be processed by the second processor in another of the sub data areas; after the first processor identifies that the second processor has processed the data stored in the previous one of the sub data areas, the first processor writes new interrupt data to the configuration area and the one of the two mailboxes, and the DPRAM generates a next first information status on the one of the two interrupt pins; the second processor reads the new interrupt data stored in the configuration area when detecting the next first information status, and processes the new data stored in the another sub data area when successfully reading the new interrupt data stored in the configuration area.

8. A method for using a dual processor system, comprising:
a first processor of the dual processor system storing data to be processed by a second processor of the dual processor system to a data area of a dual-ported random access memory (DPRAM) of the dual processor system, and writing interrupt data to the DPRAM;
the DPRAM generating a first information status;
the second processor reading the interrupt data once when detecting the first information status on the interrupt pin, processing the to be processed data when successfully reading the interrupt data once, and reading the interrupt data twice when completing processing the to be processed data;
the DPRAM generating a second information status when the second processor successfully reading the interrupt data twice, and
the first processor identifying that the second processor has processed the to be processed data when detecting the second information status.

9. The method as claimed in claim 8, wherein the DPRAM includes a data area, two mailboxes, a configuration area, and two interrupt pins; when the first processor stores data to be processed by the second processor to the data area and writes interrupt data to the configuration area and one of the two mailboxes, the DPRAM generates the first information status on one of the two interrupt pins; the second processor reads the interrupt data stored in the configuration area when detecting the first information status on the one of the two interrupt pins, processes the data stored in the data area when successfully reading the interrupt data stored in the configuration area, and reads the interrupt data stored in the one of the two mailboxes when completing processing the data stored in data area; the DPRAM generates the second information status on the one of the two interrupt pins when the second processor successfully reads the interrupt data stored in the one of the two mailboxes, and the first processor identifies that the second processor has processed the data stored in the data area when detecting the second information status on the one of the two interrupt pins.

10. The method as claimed in claim 9, further comprising:
the second processor storing data to be processed by the first processor to the data area, and writing interrupt data to the configuration area and the other of the two mailboxes;
the DPRAM generating the first information status on the other of the two interrupt pins;
the first processor reading the interrupt data stored in the configuration area when detecting the first information status on the other of the two interrupt pins, processing the data stored in the data area when successfully reading the interrupt data stored in the configuration area, and reading the interrupt data stored in the other of the two mailboxes when completing processing the data stored in data area;
the DPRAM generating the second information status on the other of the two interrupt pins when the first processor successfully reads the interrupt data stored in the other of the two mailboxes; and
the second processor identifying that the first processor has processed the data stored in the data area when detecting the second information status on the other of the two interrupt pins.

11. The method as claimed in claim 9, wherein the first information status is a predetermined low voltage level generated on either of the two interrupt pins, and the second information status is a predetermined high voltage level generated on either of the two interrupt pins.

12. The method as claimed in claim 9, further comprising:
storing the data to be processed by the second processor in one sub data area of the data area;
when the second processor is processing the data stored in the one sub data area of the data area, storing new data to be processed by the second processor in another sub data area of the data area;
after the first processor identifies that the second processor has processed the data stored in the previous one of the sub data areas, writing new interrupt data to the configuration area and the mailbox;
the DPRAM generating a next first information status on the interrupt pin; and
the second processor reading the new interrupt data stored in the configuration area when detecting the next first information status, and processing the new data stored in the another sub data area when successfully reading the new interrupt data stored in the configuration area.

* * * * *

UNITED STATES PATENT AND TRADEMARK OFFICE
CERTIFICATE OF CORRECTION

PATENT NO. : 8,312,196 B2  
APPLICATION NO. : 13/085442  
DATED : November 13, 2012  
INVENTOR(S) : Wen-Fei Xiong Page 1 of 1

It is certified that error appears in the above-identified patent and that said Letters Patent is hereby corrected as shown below:

Title Page, below Item (65) insert

-- (30)   Foreign Application Priority Data

Mar. 4 2011   (CN) .............................2011 1 0053259 --

Signed and Sealed this
Thirty-first Day of December, 2013

Margaret A. Focarino
*Commissioner for Patents of the United States Patent and Trademark Office*